(12) United States Patent
Chen et al.

(10) Patent No.: US 7,990,485 B2
(45) Date of Patent: Aug. 2, 2011

(54) PIXEL STRUCTURE

(75) Inventors: Shyh-Feng Chen, Hsinchu (TW);
Tsung-Cheng Lin, Hsinchu (TW);
Shih-Chyn Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 629 days.

(21) Appl. No.: 12/021,244

(22) Filed: Jan. 28, 2008

(65) Prior Publication Data
US 2009/0109389 A1    Apr. 30, 2009

(30) Foreign Application Priority Data
Oct. 24, 2007  (TW) .............................. 96139849 A

(51) Int. Cl.
*G02F 1/136* (2006.01)
*G02F 1/1343* (2006.01)

(52) U.S. Cl. .......................................... 349/42; 349/139

(58) Field of Classification Search .............. 349/42–43, 349/139, 143
See application file for complete search history.

(56) References Cited

U.S. PATENT DOCUMENTS

| 4,679,062 A * | 7/1987 | Okamoto ........................ 257/59 |
| 2005/0029516 A1 | 2/2005 | Lai |
| 2007/0103615 A1 * | 5/2007 | Cheng et al. .................... 349/43 |

* cited by examiner

*Primary Examiner* — Dung T. Nguyen
(74) *Attorney, Agent, or Firm* — Jianq Chyun IP Office

(57) ABSTRACT

A pixel structure electrically connected to a scan line and a data line is provided. The pixel structure includes an active device, a first pixel electrode, a mean potential equilibrium circuit, and a second pixel electrode. The active device is electrically connected to the scan line and the data line. The first pixel electrode is electrically connected to the active device. The mean potential equilibrium circuit is electrically connected to the scan line and the data line. The second pixel electrode is electrically connected to the mean potential equilibrium circuit.

13 Claims, 6 Drawing Sheets

PIXEL STRUCTURE

CROSS-REFERENCE TO RELATED APPLICATION

This application claims the priority benefit of Taiwan application serial no. 96139849, filed on Oct. 24, 2007. The entirety of the above-mentioned patent application is hereby incorporated by reference herein and made a part of this specification.

BACKGROUND OF THE INVENTION

1. Field of the Invention

The present invention relates to a display device. More particularly, the present invention relates to a liquid crystal display (LCD).

2. Description of Related Art

Currently, the performance of thin film transistor liquid crystal displays (TFT-LCD) are developed towards high contrast ratio, no gray level inversion, little color shift, high luminance, full-color, high color saturation, quick response, and wide viewing angle. At present, displays meeting the requirement for wide viewing angle include a twisted nematic (TN) LCD with a wide viewing film, an in-plane switching (IPS) LCD, a fringe field switching (FFS) LCD, a multi-domain vertical alignment (MVA) TFT-LCD, and so on. Here, an MVA-LCD panel is taken as an example. Alignment protrusions or slits formed on a color filter substrate or a TFT array substrate make liquid crystal molecules be arranged in different directions, so as to obtain multiple domains, such that the MVA-LCD panel can meet the requirement of wide viewing angle.

FIG. 1A is a graph illustrating a relation between normalized transmittance and gray level of a conventional MVA-LCD panel. Referring to FIG. 1A, the horizontal coordinate is the gray level, and the vertical coordinate is the normalized transmittance. As shown in FIG. 1A, though the conventional MVA-LCD panel meets the requirement of a wide viewing angle, the transmittance-level curve has different curvatures with the change of the observation viewing angle. In other words, when the observation angle changes, the brightness of the conventional MVA-LCD varies accordingly, leading to problems such as color shift or color washout.

Many conventional techniques have been proposed to solve the problem of color shift or color washout. Among them, a method is proposed by forming two pixel electrodes in a single pixel structure, and using a capacitive coupling effect to make the voltage of one pixel electrode be at a fixed ratio of that of the other pixel electrode, such that different pixel electrodes in a single pixel structure respectively generate different electric fields, so as to make liquid crystal molecules above the pixel electrodes be arranged in different manners. Though the above method can solve the problem of color shift or color washout, the pixel voltage generated by capacitive coupling may easily shift, which further results in display distortion.

FIG. 1B is an equivalent circuit diagram of the pixel structure of the conventional MVA-LCD panel for solving the above problem of voltage shift. Referring to FIG. 1B, the pixel structure 10 is electrically connected to a scan line 11 and a data line 12. The pixel structure 10 includes a first active device 20 electrically connected to the scan line 11 and the data line 12, a first pixel electrode 30 electrically connected to the first active device 20, a second pixel electrode 40, and a second active device 50 electrically connected to the second pixel electrode 40. The second pixel electrode 40 is coupled to the first pixel electrode 30 through a coupling capacitor 60. The second pixel electrode 40 generates a second pixel voltage $Vp_2$ through the coupling capacitor 60 under the coupling effect of a first pixel voltage $Vp_1$ of the first pixel electrode 30. As shown in FIG. 1B, the second pixel voltage $Vp_2$ of the second pixel electrode 40 is stabilized by the second active device 50.

Referring to FIG. 1B, though the second active device 50 is capable of eliminating the problem of voltage shift, as the second pixel voltage $Vp_2$ is influenced by a kick-back voltage generating from the second active device 50, the average second pixel voltage $Vp_2$ of the second pixel electrode 40 is quite different from the average first pixel voltage $Vp_1$ of the first pixel electrode 30, thus resulting in flicker of the LCD panel. Further, when the first active device 20 is turned-on to perform a charging procedure on the first pixel electrode 30, the second active device 50 is turned-on at the same time to perform a charging procedure on the second pixel electrode 40. As a result, the second pixel voltage $Vp_2$ of the second pixel electrode 40 may shift, resulting in the change of the original display gray level. Additionally, since the device characteristic (for example, width/length ratio of the channel layer, W/L) of the second active device 50 is closely related to the display gray level of the second pixel electrode 40, the display stability of the LCD will be adversely affected when the line width or alignment of the second active device 50 varies due to process errors.

SUMMARY OF THE INVENTION

Accordingly, the present invention is directed to a pixel structure capable of solving problems such as flicker and image sticking.

As broadly embodied and described herein, a pixel structure electrically connected to a scan line and a data line is provided. The pixel structure includes an active device, a first pixel electrode, a mean potential equilibrium circuit, and a second pixel electrode. The active device is electrically connected to the scan line and the data line. The first pixel electrode is electrically connected to the active device. The mean potential equilibrium circuit is electrically connected to the scan line and the data line. The second pixel electrode is electrically connected to the mean potential equilibrium circuit.

In an embodiment of the present invention, the capacitive coupling effect between the second pixel electrode and the first pixel electrode makes the second pixel electrode have a potential, and the mean potential equilibrium circuit makes the mean potential of the second pixel electrode be approximate to the mean potential of the first pixel electrode.

In an embodiment of the present invention, the mean potential equilibrium circuit includes a control electrode, a gate insulating layer, an active layer, a first electrode, and a second electrode. The control electrode is electrically connected to the scan line. The active layer overlaps a portion of the control electrode. The active layer has a depletion region, and the depletion region does not overlap the control electrode. The gate insulating layer is disposed between the control electrode and the active layer. The first and second electrodes are disposed on the active layer. The first electrode is electrically connected to the data line, and the second electrode is electrically connected to the second pixel electrode. At least a portion of the depletion region of the active layer is located between the first electrode and the second electrode.

In an embodiment of the present invention, the active layer has two channel regions separated respectively. The two channel regions are connected to the depletion region, and the first electrode and the second electrode are respectively connected to the two channel regions.

In an embodiment of the present invention, the active layer has a channel region. The channel region is connected to the depletion region, and the first electrode and the second electrode are respectively connected to the depletion region and the channel region.

In an embodiment of the present invention, the control electrode has a notch. The location of the notch is corresponding to that of the depletion region. Further, the active layer has two channel regions separated respectively. The two channel regions are connected to the depletion region, and the first electrode and the second electrode are respectively connected to the two channel regions. In another embodiment of the present invention, the active layer has a channel region. The channel region is connected to the depletion region, and the first electrode and the second electrode are respectively connected to the depletion region and the channel region.

In an embodiment of the present invention, the control electrode has an opening. The location of the opening is corresponding to that of the depletion region. Further, the active layer has two channel regions separated respectively. The two channel regions are connected to the depletion region, and the first electrode and the second electrode are respectively connected to the two channel regions. In another embodiment of the present invention, the active layer has a channel region. The channel region is connected to the depletion region, and the first electrode and the second electrode are respectively connected to the depletion region and the channel region.

Another pixel structure electrically connected to a scan line and a data line is provided. The pixel structure includes an active device, a first pixel electrode, a mean potential equilibrium circuit, and a second pixel electrode. The active device is electrically connected to the scan line and the data line. The first pixel electrode is electrically connected to the active device. The mean potential equilibrium circuit is electrically connected to the scan line and the data line. The mean potential equilibrium circuit includes a control electrode electrically connected to the scan line and an active layer overlapped with a portion of the control electrode. In addition, the active layer has a depletion region, and the depletion region does not overlap the control electrode. The second pixel electrode is electrically connected to the mean potential equilibrium circuit.

In view of the above, the pixel structure of the present invention can eliminate the problem of color shift and meanwhile uses the mean potential equilibrium circuit to stabilize the potential generated by the capacitive coupling effect. Therefore, the mean potential of the first pixel electrode in the pixel structure equals the mean potential of the second pixel electrode in the pixel structure, thus improving the display quality.

In order to make the aforementioned and other objectives, features, and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
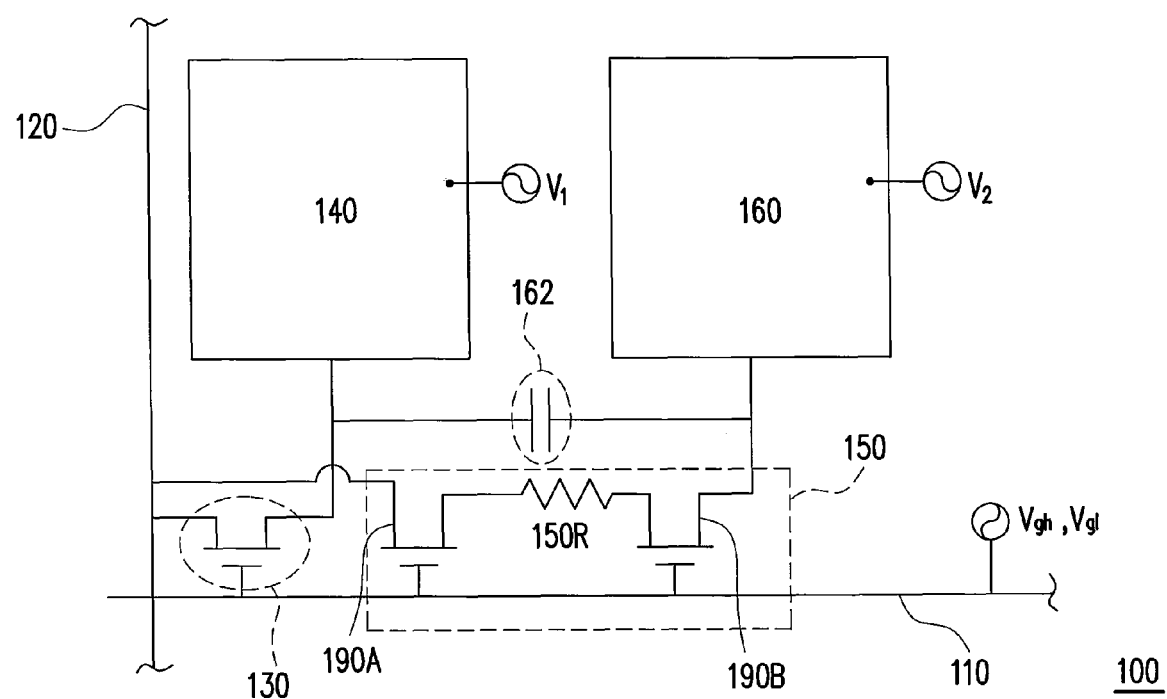
FIG. 2 is an equivalent circuit diagram of the pixel structure according to the present invention.

FIG. 2 is an equivalent circuit diagram of a pixel structure according to the present invention. Referring to FIG. 2, the pixel structure 100 is electrically connected to a scan line 110 and a data line 120. The pixel structure 100 includes an active device 130, a first pixel electrode 140, a mean potential equilibrium circuit 150, and a second pixel electrode 160. The active device 130 is electrically connected to the scan line 110 and the data line 120. The first pixel electrode 140 is electrically connected to the active device 130. The mean potential equilibrium circuit 150 is electrically connected to the scan line 110 and the data line 120. The second pixel electrode 160 is electrically connected to the mean potential equilibrium circuit 150, and is electrically insulated from the first pixel electrode 140. The capacitive coupling effect between the second pixel electrode 160 and the first pixel electrode 140 makes the second pixel electrode 160 have a potential, and the mean potential equilibrium circuit 150 makes the mean potential of the second pixel electrode 160 be approximate to the mean potential of the first pixel electrode 140.

In detail, when the voltage of the scan line 110 is at a turn-on voltage level $V_{gh}$, the active device 130 is turned on to perform a charging procedure on the first pixel electrode 140. A pixel voltage is input to the first pixel electrode 140 through the data line 120, and the pixel voltage is set to be a first potential $V_1$. The capacitive coupling effect between the second pixel electrode 160 and the first pixel electrode 140 makes the second pixel electrode 160 generate another pixel voltage by coupling the first potential $V_1$ of the first pixel electrode 140. The generated pixel voltage is set to be a second potential $V_2$. As shown in FIG. 2, a coupling capacitor 162 is disposed between the first pixel electrode 140 and the second pixel electrode 160. The capacitive coupling effect between the first pixel electrode 140 and the second pixel electrode 160 may be determined by the coupling capacitor 162, and the second potential $V_2$ of the second pixel electrode 160 is determined accordingly.

It should be noted that, when the pixel structure 100 is charged, the mean potential equilibrium circuit 150 restrains the impact of the data line 120 on the second potential $V_2$ of the second pixel electrode 160, such that the mean second potential $V_2$ of the second pixel electrode 160 is approximate to the mean first potential $V_1$ of the first pixel electrode 140. In another aspect, when the voltage of the scan line 110 is at a turn-off voltage level $V_{gl}$, the pixel structure 100 is in a potential holding state. Thus, the mean potential equilibrium circuit 150 stabilizes the second potential $V_2$ of the second pixel electrode 160. The mean potential equilibrium circuit 150 is illustrated in detail below.

Figure 3A:
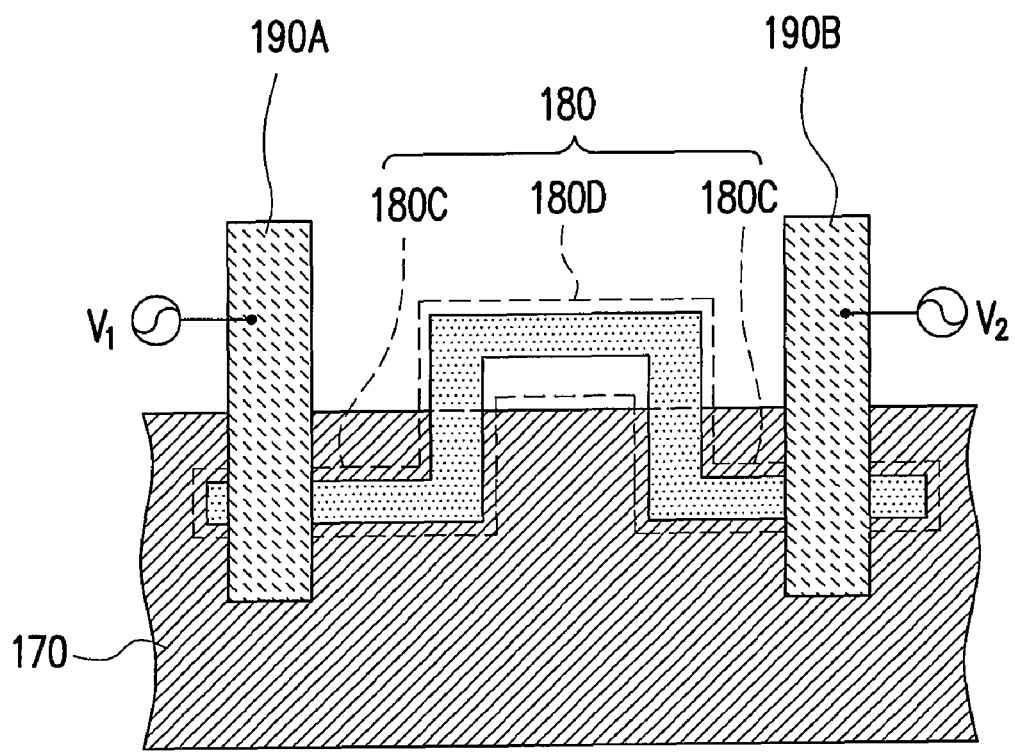
FIG. 3A is a schematic top view of a mean potential equilibrium circuit according to the present invention.

FIG. 3A is a schematic top view of a mean potential equilibrium circuit according to the present invention. Referring to FIGS. 3A and 2, the mean potential equilibrium circuit 150 includes a control electrode 170, a gate insulating layer (not shown), an active layer 180, a first electrode 190A, and a second electrode 190B. The control electrode 170 is electrically connected to the scan line 110. The active layer 180 is overlapped with a portion of the control electrode 170 and has a depletion region 180D. The depletion region 180D is not overlapped with the control electrode 170 and is not controlled by the control electrode 170. Further, the gate insulating layer (not shown) is disposed between the control electrode 170 and the active layer 180. It should be noted that, the control electrode 170 of this embodiment is disposed below the active layer 180, and in other embodiments, the control electrode 170 may also be disposed above the active layer 180. Thus, the arrangement of the control electrode 170 and the active layer 180 is not limited by the present invention. The first electrode 190A and the second electrode 190B are disposed on the active layer 180. The first electrode 190A is electrically connected to the data line 120, and the second electrode 190B is electrically connected to the second pixel electrode 160. At least a portion of the depletion region 180D of the active layer 180 is located between the first electrode 190A and the second electrode 190B. In this embodiment, the active layer 180 has two channel regions 180C separated each other. The two channel regions 180C are connected to the depletion region 180D, and the first electrode 190A and the second electrode 190B are respectively connected to the two channel regions 180C.

Generally, when the voltage of the scan line 110 is at a turn-on voltage level $V_{gh}$, the channel region 180C of the active layer 180 overlapped with the control electrode 170 is actuated. The first electrode 190A and the second electrode 190B are electrically connected to each other by the actuated channel region 180C so as to transmit data. Particularly, in this embodiment, the active layer 180 of the mean potential equilibrium circuit 150 has a depletion region 180D that is not overlapped with the control electrode 170. Even if a voltage at a turn-on voltage level $V_{gh}$ is input into the control electrode 170, the depletion region 180D still remains off and the first electrode 190A and the second electrode 190B are still independent.

Figure 1A:
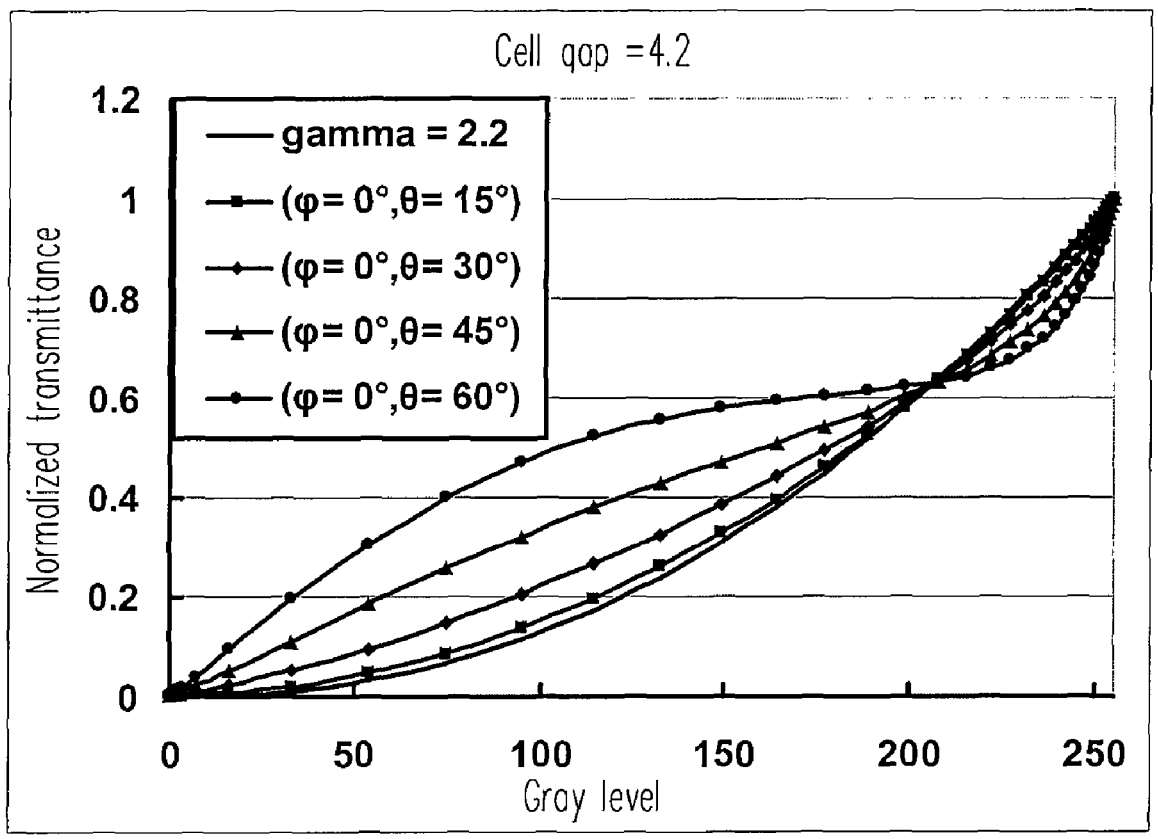
FIG. 1A is a graph illustrating the relation between normalized transmittance and gray level of the conventional MVA-LCD panel.
Figure 1B:
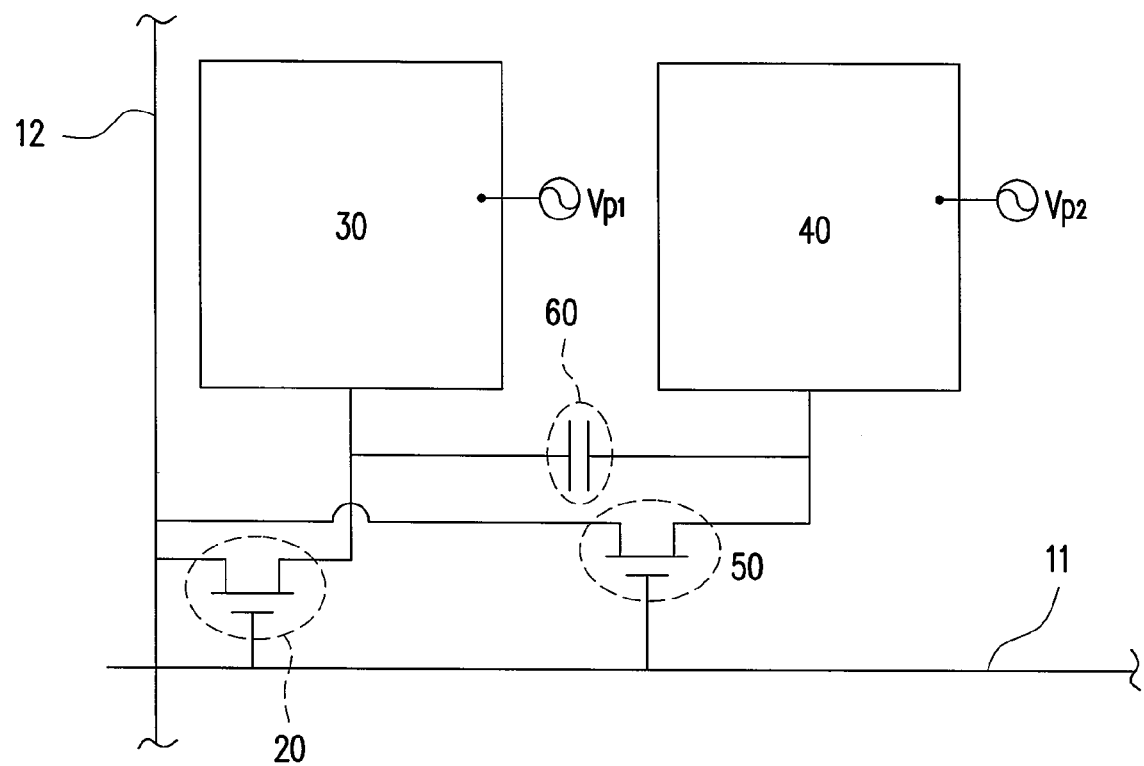
FIG. 1B is an equivalent circuit diagram of the pixel structure of the conventional MVA-LCD panel.

Referring to FIGS. 2 and 3A together, the first electrode 190A in FIG. 3A is electrically connected to the data line 120 in FIG. 2, and the second electrode 190B in FIG. 3A is electrically connected to the second pixel electrode 160 in FIG. 2. When the voltage of the scan line 110 is at a turn-on voltage level $V_{gh}$, a first potential $V_1$ is input into the first pixel electrode 140 through the actuated active device 130. Meanwhile, the control electrode 170 of the mean potential equilibrium circuit 150 actuates the channel region 180C of the active layer 180. However, as the depletion region 180D of the active layer 180 is not actuated by the control electrode 170, the depletion region 180D is equivalent to a resistor 150R in the equivalent circuit of FIG. 2. Thus, the first potential $V_1$ of the data line 120 may not seriously influence the second pixel electrode 160, and the second pixel electrode 160 remains at the second potential $V_2$. Therefore, the mean potential equilibrium circuit 150 is different from the conventional second active device 50 (as shown in FIG. 1B). When the first pixel electrode 140 is charged, the mean potential equilibrium circuit 150 restrains the impact of the data line 120 on the second potential $V_2$ of the second pixel electrode 160, and thus restrains the generation of a kick-back voltage. Therefore, the mean second potential $V_2$ of the second pixel electrode 160 is approximate to the mean first potential $V_1$ of the first pixel electrode 140. As a result, the problem of flicker can be effectively mitigated during the display of the LCD panel, and image sticking due to long-time operation may also be mitigated.

Referring to FIGS. 2 and 3A, when the voltage of the scan line 110 is at a turn-off voltage level $V_{gl}$, the first pixel electrode 140 and the second pixel electrode 160 are in a potential holding state. As the current leakage of the mean potential equilibrium circuit 150 occurs, the leakage current of the mean potential equilibrium circuit 150 is utilized by the second pixel electrode 160 to prevent the second potential $V_2$ from shifting.

Figure 3B:
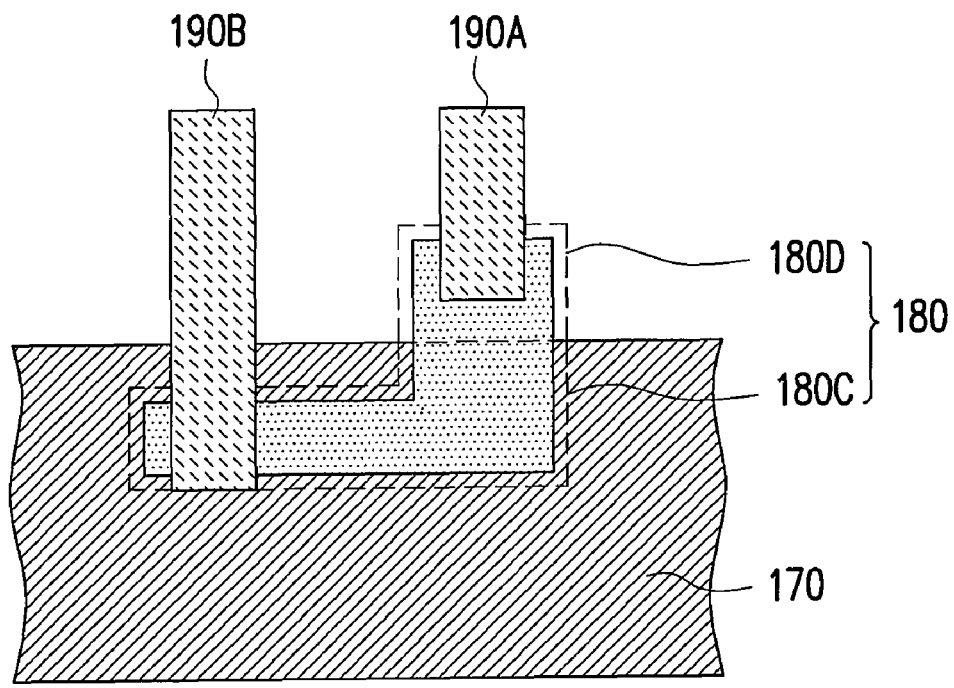
FIG. 3B is a schematic top view of a mean potential equilibrium circuit according to the present invention.

It should be noted that the present invention does not limit the layout of the active layer 180 of the mean potential equilibrium circuit 150. FIG. 3B is a schematic top view of another mean potential equilibrium circuit. Referring to FIG. 3B, the active layer 180 may also have a channel region 180C connected to the depletion region 180D, and the first electrode 190A and the second electrode 190B are respectively connected to the depletion region 180D and the channel region 180C. Definitely, the locations of the first electrode 190A and the second electrode 190B may be exchanged. In other words, the first electrode 190A and the second electrode 190B are respectively connected to the channel region 180C and the depletion region 180D.

Figure 3C:
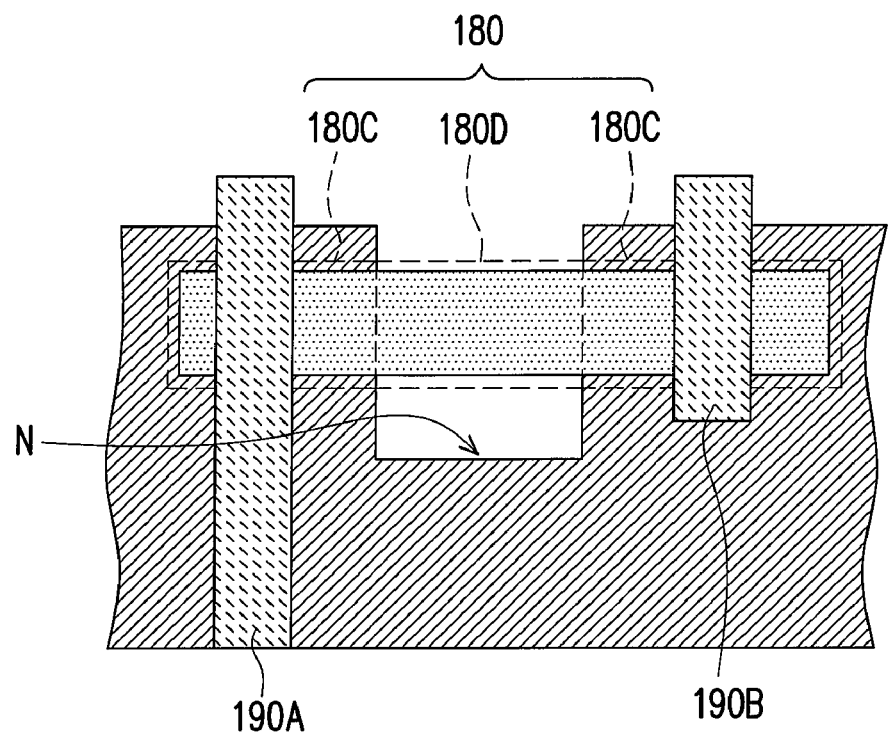
FIG. 3C is a schematic view of another mean potential equilibrium circuit according to the present invention.
Figure 3D:
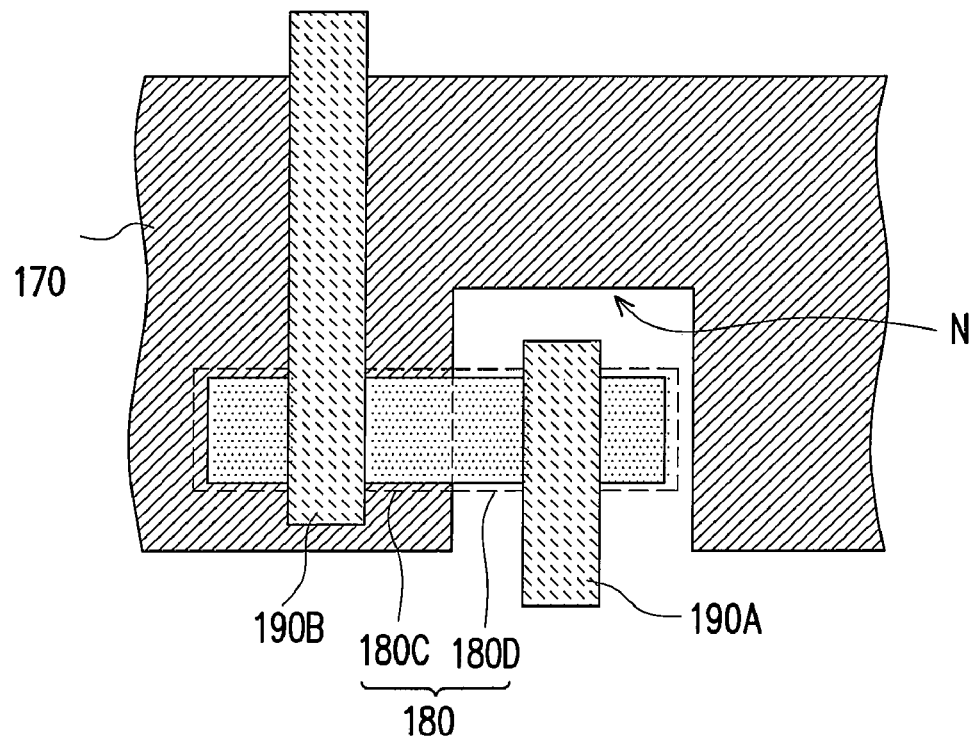
FIG. 3D is a schematic view of another mean potential equilibrium circuit according to the present invention.

Further, the designer can adjust the shape of the control electrode 170 of the mean potential equilibrium circuit 150 according to the layout space, aperture ratio, or other design rules of the pixel structure 100. FIG. 3C is a schematic top view of another mean potential equilibrium circuit according to the present invention. Referring to FIG. 3C, the control electrode 170 has a notch N, and the location of the notch N is corresponding to the position of the depletion region 180D. The active layer 180 has two channel regions 180C separated each other. The two channel regions 180C are connected to the depletion region 180D, and the first electrode 190A and the second electrode 190B are respectively connected to the two channel regions 180C. Definitely, the active layer 180 may also have only a channel region 180C connected to the depletion region 180D, and the first electrode 190A and the second electrode 190B are respectively connected to the depletion region 180D and the channel region 180C, as shown in FIG. 3D. Likewise, the locations of the first electrode 190A and the second electrode 190B may be exchanged. Thus, the layout of the active layer 180 and the shape, number, and location of the notch N of the control electrode 170 are not limited in the present invention.

Figure 3E:
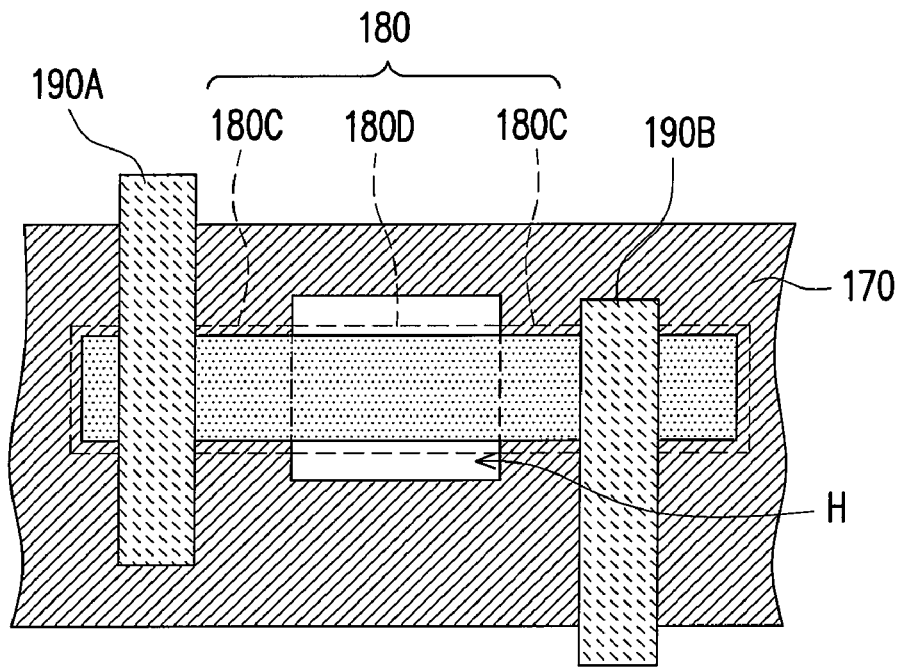
FIG. 3E is a schematic view of still another mean potential equilibrium circuit according to the present invention.
Figure 3F:
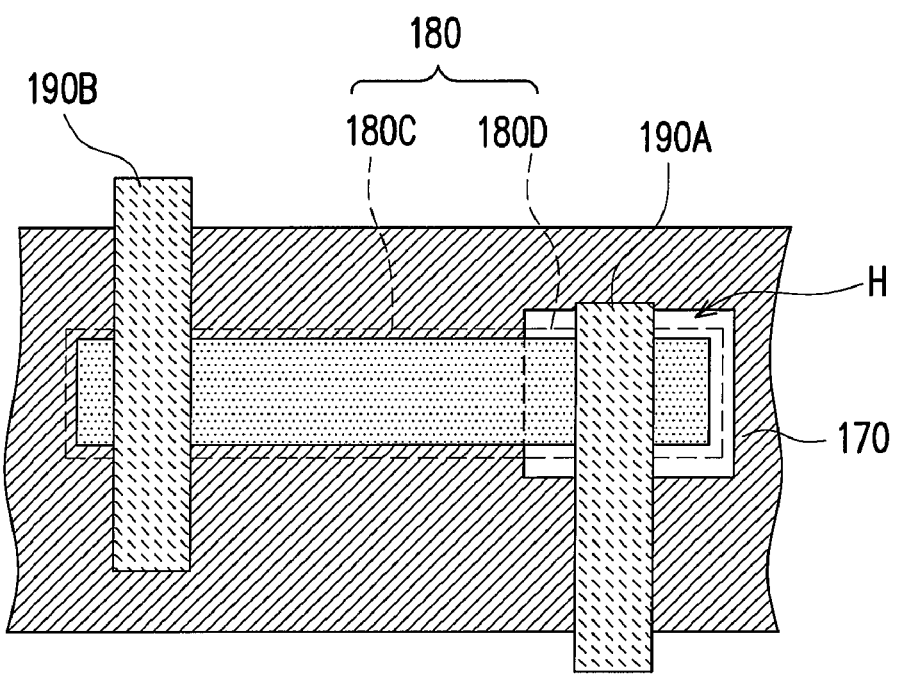
FIG. 3F is a schematic view of still another mean potential equilibrium circuit according to the present invention.

In view of the above, FIG. 3E is a schematic top view of another mean potential equilibrium circuit according to the present invention. Referring to FIG. 3E, the control electrode 170 has an opening H, and the location of the opening H is corresponding to the position of the depletion region 180D. The active layer 180 has two channel regions 180C. The two channel regions 180C are separated respectively and connected to the depletion region 180D, and the first electrode 190A and the second electrode 190B are respectively connected to the two channel regions 180C. Definitely, the active layer 180 may also be in the form as shown in FIG. 3F. The active layer 180 has a channel region 180C connected to the depletion region 180D, and the first electrode 190A and the second electrode 190B are respectively connected to the depletion region 180D and the channel region 180C. Likewise, the location of the first electrode 190A and the second electrode 190B may also be exchanged. Thus, the layout of the active layer 180 and the shape, quantity, and location of the opening H of the control electrode 170 are not limited in the present invention.

In view of the above, the pixel structure of the present invention mitigates the color shift or color washout of the LCD panel, and meanwhile the second potential of the second pixel electrode may be stabilized through the mean potential equilibrium circuit, thus avoiding flicker in display. During long-time operation, the present invention can solve the image sticking problem resulted from differences of the mean potentials of the first pixel electrode and the second pixel electrode.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, electrically connected to a scan line and a data line, comprising:
   an active device electrically connected to the scan line and the data line;
   a first pixel electrode electrically connected to the active device;
   a mean potential equilibrium circuit electrically connected to the scan line and the data line; and
   a second pixel electrode electrically connected to the mean potential equilibrium circuit, wherein a capacitive coupling effect between the second pixel electrode and the first pixel electrode makes the second pixel electrode have a potential, and the mean potential equilibrium circuit makes a mean potential of the second pixel electrode be approximate to a mean potential of the first pixel electrode.

2. The pixel structure as claimed in claim 1, wherein the second pixel electrode and the first pixel electrode are electrically insulated from each other.

3. The pixel structure as claimed in claim 1, wherein the mean potential equilibrium circuit comprises:
   a control electrode electrically connected to the scan line;
   an active layer overlapped with a portion of the control electrode, wherein the active layer has a depletion region, and the depletion region is not overlapped with the control electrode;
   a gate insulating layer disposed between the control electrode and the active layer; and
   a first electrode and a second electrode disposed on the active layer, wherein the first electrode is electrically connected to the data line, the second electrode is electrically connected to the second pixel electrode, and at least a portion of the depletion region of the active layer is located between the first electrode and the second electrode.

4. The pixel structure as claimed in claim 3, wherein the active layer has two channel regions, the two channel regions are separated respectively and connected to the depletion region, and the first electrode and the second electrode are respectively connected to the two channel regions.

5. The pixel structure as claimed in claim 3, wherein the active layer has a channel region, the channel region is connected to the depletion region, and the first electrode and the second electrode are respectively connected to the depletion region and the channel region.

6. The pixel structure as claimed in claim 3, wherein the control electrode has a notch, and a location of the notch is corresponding to that of the depletion region.

7. The pixel structure as claimed in claim 6, wherein the active layer has two channel regions, the two channel regions are separated respectively and connected to the depletion region, and the first electrode and the second electrode are respectively connected to the two channel regions.

8. The pixel structure as claimed in claim 6, wherein the active layer has a channel region, the channel region is connected to the depletion region, and the first electrode and the second electrode are respectively connected to the depletion region and the channel region.

9. The pixel structure as claimed in claim 3, wherein the control electrode has an opening, and a location of the opening is corresponding to that of the depletion region.

10. The pixel structure as claimed in claim 9, wherein the active layer has two channel regions, the two channel regions are separated respectively and connected to two sides of the depletion region, and the first electrode and the second electrode are respectively connected to the two channel regions.

11. The pixel structure as claimed in claim 9, wherein the active layer has a channel region, the channel region is connected to the depletion region, and the first electrode and the second electrode are respectively connected to the depletion region and the channel region.

12. A pixel structure, electrically connected to a scan line and a data line, comprising:
   an active device electrically connected to the scan line and the data line;
   a first pixel electrode electrically connected to the active device;
   a mean potential equilibrium circuit electrically connected to the scan line and the data line, comprising:
   a control electrode electrically connected to the scan line; and
   an active layer overlapped with a portion of the control electrode, wherein the active layer has a depletion region, and the depletion region is not overlapped with the control electrode; and
   a second pixel electrode electrically connected to the mean potential equilibrium circuit.

13. The pixel structure as claimed in claim 12, wherein the second pixel electrode and the first pixel electrode are electrically insulated from each other.

* * * * *